(12) United States Patent  
Takagi et al.

(10) Patent No.: US 9,176,349 B2
(45) Date of Patent: Nov. 3, 2015

(54) GRADIENT REFRACTIVE INDEX LIQUID CRYSTAL OPTICAL APPARATUS AND IMAGE DISPLAY APPARATUS

(71) Applicant: Kabushiki Kaisha Toshiba, Tokyo (JP)

(72) Inventors: Ayako Takagi, Yokosuka (JP); Shinichi Uehara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/690,552

(22) Filed: Apr. 20, 2015

(65) Prior Publication Data

US 2015/0227007 A1     Aug. 13, 2015

Related U.S. Application Data

(60) Continuation of application No. 14/168,048, filed on Jan. 30, 2014, now Pat. No. 9,036,101, which is a division of application No. 13/210,481, filed on Aug. 16, 2011, now Pat. No. 8,675,148.

(30) Foreign Application Priority Data

Dec. 27, 2010   (JP) ................................ 2010-290644

(51) Int. Cl.
    *G02F 1/1335*   (2006.01)
    *G02F 1/1343*   (2006.01)
    (Continued)

(52) U.S. Cl.
    CPC ...... *G02F 1/134309* (2013.01); *G02F 1/13306* (2013.01); *G02F 1/133345* (2013.01); *G02F 1/1343* (2013.01); *G02F 1/29* (2013.01)

(58) Field of Classification Search
    CPC ......................................................... G02F 1/29
    See application file for complete search history.

(56) References Cited

U.S. PATENT DOCUMENTS 5,493,427 A    2/1996   Nomura et al.
6,577,434 B2   6/2003   Hamada
(Continued)

FOREIGN PATENT DOCUMENTS

CN    101073022 A1   11/2007
CN    101762896 A     6/2010
(Continued)

OTHER PUBLICATIONS

Notification of Reason for Rejection issued by the Japanese Patent Office on Nov. 27, 2012, for Japanese Patent Application No. 2010-290644, and English-language translation thereof.

(Continued)

*Primary Examiner* — Wen-Ying P Chen
(74) *Attorney, Agent, or Firm* — Finnegan, Henderson, Farabow, Garrett & Dunner, L.L.P.

(57) ABSTRACT

A gradient index liquid crystal optical apparatus according to an embodiment includes: a first substrate having a first face; a second substrate having a second face opposed to the first face of the first substrate; a liquid crystal layer sandwiched between the first substrate and the second substrate; a plurality of first electrodes provided on the first face of the first substrate, and arranged along a first direction; a plurality of second electrodes provided on the first face of the first substrate to correspond to the first electrodes, the plurality of second electrodes being arranged along the first direction; a plurality of third electrodes provided on the first face of the first substrate and arranged along the first direction; and a fourth electrode provided on the second face of the second substrate.

7 Claims, 6 Drawing Sheets

(51) Int. Cl.
*G02F 1/1333* (2006.01)
*G02F 1/133* (2006.01)
*G02F 1/29* (2006.01)

(56) References Cited

U.S. PATENT DOCUMENTS

| | | |
|---|---|---|
| 7,423,801 B2 | 9/2008 | Kaufman et al. |
| 2003/0063186 A1 | 4/2003 | Tomono |
| 2007/0182915 A1 | 8/2007 | Osawa et al. |
| 2008/0106806 A1 | 5/2008 | Hendriks et al. |
| 2010/0026920 A1 | 2/2010 | Kim et al. |
| 2010/0157181 A1 | 6/2010 | Takahashi |
| 2010/0238276 A1 | 9/2010 | Takagi et al. |
| 2011/0128456 A1 | 6/2011 | Son |

FOREIGN PATENT DOCUMENTS

| | | |
|---|---|---|
| JP | 7-77748 | 3/1995 |
| JP | 2000-102038 | 4/2000 |
| JP | 2003-177356 | 6/2003 |
| JP | 2005-222587 | 8/2005 |
| JP | 2008-216626 | 9/2008 |
| JP | 2010-224191 | 10/2010 |
| KR | 10-2007-0035043 | 3/2007 |
| KR | 10-2007-0118594 | 12/2007 |
| KR | 10-0784080 | 12/2007 |
| WO | WO 2006/054803 A1 | 5/2006 |

OTHER PUBLICATIONS

Notice of Allowance issued by the Korean Intellectual Property Office on Oct. 25, 2012, for Korean Patent Application No. 10-2011-0085736, and English-language translation thereof.

Official Action issued by the Taiwanese Patent Office on Oct. 23, 2013, for Taiwanese Patent Application No. 100128671, and English-language translation thereof.

Notification of the First Office Action issued by the State Intellectual Property Office of the People's Republic of China on Dec. 3, 2013, for Chinese Patent Application No. 201110249752.8, and English-language translation thereof.

Notification of Reason for Rejection issued by the Japanese Patent Office on Jan. 28, 2014, for Japanese Patent Application No. 2013-013447, and English-language translation thereof.

Notification of the Second Office Action issued by the State Intellectual Property Office of the People's Republic of China on Mar. 5, 2014, for Chinese Patent Application No. 201110249752.8, and English-language translation thereof.

23  22 21  25

GRADIENT REFRACTIVE INDEX LIQUID CRYSTAL OPTICAL APPARATUS AND IMAGE DISPLAY APPARATUS

CROSS-REFERENCE TO RELATED APPLICATION

This is a continuation application of U.S. patent application Ser. No. 14/168,048, filed Jan. 30, 2014, which is a divisional application of U.S. patent application Ser. No. 13/210,481, filed Aug. 16, 2011 (now U.S. Pat. No. 8,675,148 B2, issued Mar. 18, 2014), which is incorporated herein by reference.

This application is based upon and claims the benefit of priority from prior Japanese Patent Application No. 2010-290644 filed on Dec. 27, 2010 in Japan, the entire contents of which are incorporated herein by reference.

FIELD

Embodiments described herein relate generally to a gradient refractive index liquid crystal optical apparatus, and image display apparatus.

BACKGROUND

A display apparatus capable of displaying a stereoscopic image (three-dimensional image) is proposed. Furthermore, there is a request to implement two-dimensional image display and three-dimensional image display in the same display apparatus by switching between them, and a technique for satisfying the request is proposed. For example, there is a technique of performing switching between the two-dimensional image display and the three-dimensional image display by using a liquid crystal lens array element. This liquid crystal lens array element has cylindrical electrodes disposed periodically on a first substrate. And electric field distribution is generated between the first substrate and a second substrate which is opposed to the first substrate, and the orientation of the liquid crystal layer is changed by the electric field distribution. As a result, refractive index distribution which acts as a lens is generated. The lens action can be turned on or off by controlling a voltage applied to the electrodes. As a result, switching between the two-dimensional image display and the three-dimensional image display can be conducted. The method for controlling the orientation direction of liquid crystal molecules by the electric field in this way is called liquid crystal gradient index lens method or liquid crystal gradient index (GRIN) lens method.

Furthermore, a technique of applying different voltages of two kinds to the cylindrical electrodes disposed periodically on the first substrate is proposed. And refractive index distribution which is more desirable as the lens array is generated by applying the different voltages of two kinds.

Thus, attempts for implementing the liquid crystal GRIN lens are performed. For implementing favorable three-dimensional image display by using the liquid crystal GRIN lens, however, it is necessary to set the focal length of the liquid crystal GRIN lens nearly equal to a distance between a principal point of the liquid crystal GRIN lens and a pixel plane of an image display unit. For this purpose, refractive power of some degree is required of the liquid crystal layer of the liquid crystal GRIN lens. Since the refractive index anisotropy of liquid crystal molecules are typically as small as approximately 0.2, it is necessary to make the thickness of the liquid crystal layer considerably greater than that of the ordinary display panel. This brings about a problem that not only the cost increases because of an increased use of liquid crystal but also the difficulty in manufacturing increases, too.

Therefore, it is proposed to form the liquid crystal GRIN lens as a Fresnel lens. In the proposal, refractive index distribution serving as a Fresnel lens is implemented by disposing a large number of cylindrical electrodes on a first substrate and applying a large number of different voltages to the cylindrical electrodes.

In a Fresnel lens type liquid crystal GRIN lens array, however, it is necessary to dispose a large number of cylindrical electrodes in each lens and a technique of processing transparent electrodes finely becomes necessary. The fine processing of the transparent electrodes has a problem that the cost increases because a high precision stepper or dry etching apparatus is needed. Furthermore, there is a problem that the cost increases because it is necessary to apply a large number of different voltages to a large number of cylindrical electrodes and the drive becomes complicated.

DETAILED DESCRIPTION

Figure 1:
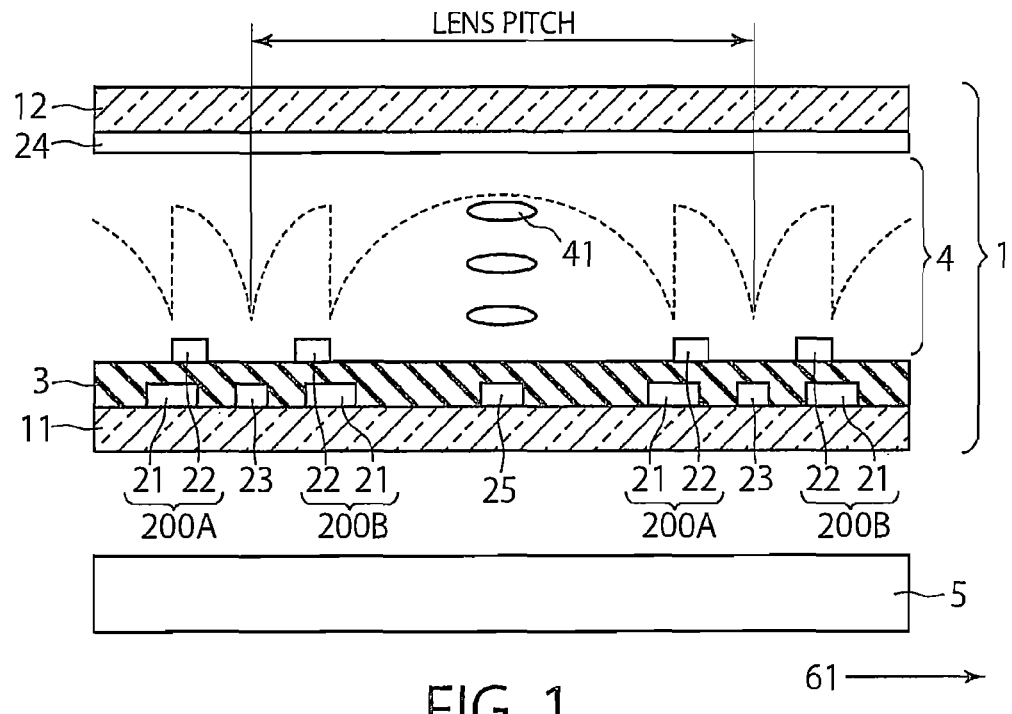
FIG. 1 is a sectional view of an image display apparatus according to a first embodiment.

An image display apparatus according to an embodiment includes: a first substrate having a first face; a second substrate having a second face opposed to the first face; a liquid crystal layer sandwiched between the first substrate and the second substrate; a plurality of first electrodes provided on the first face of the first substrate, and arranged along a first direction; a plurality of second electrodes provided on the first face of the first substrate to correspond to the first electrodes, the plurality of second electrodes being arranged along the first direction; a plurality of third electrodes provided on the first face of the first substrate and arranged along the first direction; and a fourth electrode provided on the second face of the second substrate. A first electrode pair including the first electrode and the second electrode corresponding to the first electrode is disposed on a first side of the third electrode, and a second electrode pair including the first electrode and the second electrode corresponding to the first electrode is disposed on an opposite side of the first side of the third electrode, in the first electrode pair viewed from the second substrate, a center of the second electrode of the first electrode pair in a section along the first direction is located near the third electrode as compared with a center of the first electrode of the first electrode pair, and a center of the second electrode of the second electrode pair in the section along the first direction is located near the third electrode as compared with a center of the first electrode of the second electrode pair viewed from the second substrate.

Hereafter, an image display apparatus according to embodiments will be described more specifically with reference to the drawings. Supposing in the ensuing embodiments that parts denoted by the same reference character conduct like operations, a duplicated description will be omitted suitably.

First Embodiment

Figure 2:
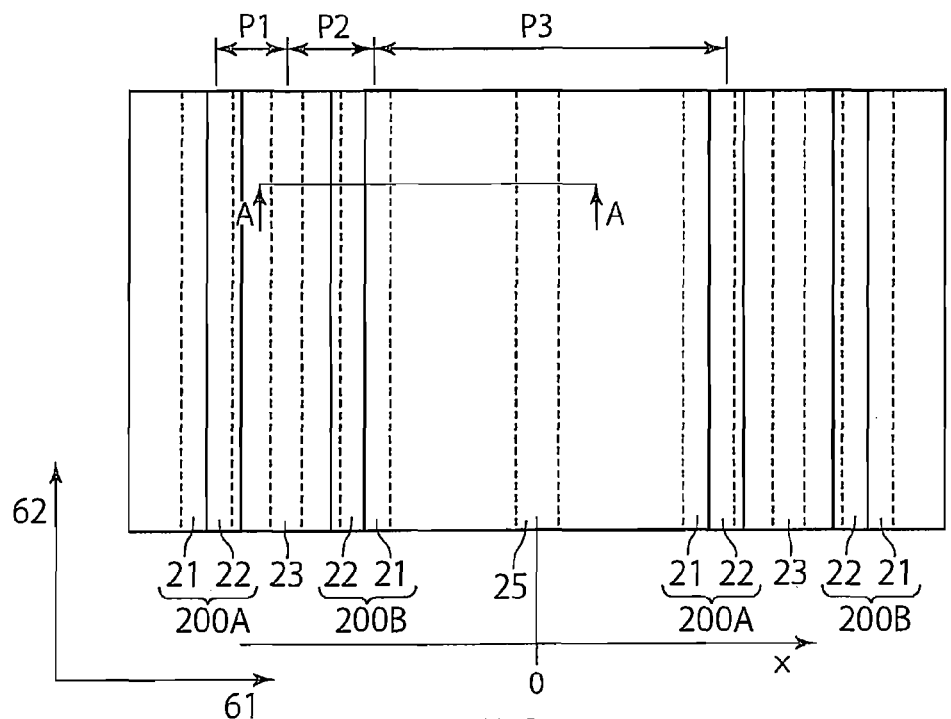
FIG. 2 is a top view of a liquid crystal GRIN lens array in the first embodiment.

An image display apparatus according to the first embodiment will now be described with reference to FIGS. 1 to 5. The image display apparatus according to the first embodiment is shown in FIG. 1. The image display apparatus according to the present embodiment includes a gradient index liquid crystal optical apparatus 1 and an image display unit 5. The image display unit 5 is a display panel having pixels arranged on a display screen in a matrix form. For example, a liquid crystal panel, an organic EL panel, a plasma display panel or the like can be used preferably as the display panel. Note that, in the present embodiment, the image display unit 5 is configured to illuminate linearly polarized light along a first direction 61 indicated by an arrow. Furthermore, in the present embodiment, the gradient index liquid crystal optical apparatus 1 is a liquid crystal GRIN lens array. A top view of the liquid crystal GRIN lens array is shown in FIG. 2.

The liquid crystal GRIN lens array 1 has a configuration in which a liquid crystal layer is sandwiched between a first transparent substrate 11 which is provided in front of the image display unit 5 and a second transparent substrate 12 which is opposed to the first substrate 11. On or over a plane of the first substrate 1 opposed to the liquid crystal layer, a first transparent electrode 21, a second transparent electrode 22, a third transparent electrode 23, a fifth transparent electrode 25, and a transparent dielectric layer 3 are provided. As shown in FIG. 2, the first electrode 21, the second electrode 22, the third electrode 23, and the fifth electrode 25 are provided to extend in a second direction 62 which crosses the first direction 61. Although the second direction 62 is disposed to be perpendicular to the first direction 61 in FIG. 2, the second direction 62 may not be perpendicular to the first direction 61. Furthermore, on a plane of the second substrate 12 which is opposed to the liquid crystal layer, a fourth transparent electrode 24 is provided. The fourth transparent electrode 24 is provided to be opposed to the first electrode 21, the second electrode 22, the third electrode 23, and the fifth electrode 25, and provided on nearly the whole plane of the second substrate 12 which is opposed to the second substrate 12. The liquid crystal layer 4 includes liquid crystal molecules 41. In the present embodiment, a substance which exhibits uniaxial double refraction is used as the liquid crystal molecules 41. As for the initial orientation of the liquid crystal molecules 41 when no voltage is applied to the first to fifth electrodes, its major axis direction becomes the first direction 61.

On the plane of the first substrate 11 opposed to the liquid crystal layer, a plurality of the third electrodes 23 are disposed in parallel along the first direction 61. The first electrodes 21 are disposed on both sides of each of the third electrodes. The fifth electrode 25 is disposed nearly in the center between adjacent third electrodes. The first electrodes 21, third electrodes 23 and the fifth electrode are covered by the dielectric layer 3. On the dielectric layer 3, the second electrodes 22 are provided to be associated with the first electrodes 21, respectively. Therefore, the second electrodes 22 are electrically insulated from the first electrodes 21, the third electrodes 23 and the fifth electrode by the dielectric layer 3. A center axis, extending in the second direction, of each of the second electrodes 22 is disposed to be located on the side of the third electrode 23 with respect to a center axis of a corresponding first electrode 21.

Herein, a pair of a first electrode 21 disposed on the left side of a third electrode 23 and a second electrode 22 corresponding to the first electrode 21 in FIG. 1 is referred to as electrode pair 200A, and a pair of a first electrode 21 disposed on the right side of the third electrode 23 and a second electrode 22 corresponding to the first electrode 21 is referred to as electrode pair 200B. Thereupon, the electrode pair 200A, the third electrode 23, the electrode pair 200B, the fifth electrode 25, the electrode pair 200A, the third electrode 23, and the electrode pair 200B are disposed on the first substrate 11 in the cited order from the left side of FIG. 1. In other words, the electrode pair 200A and the electrode pair 200B are disposed between the third electrodes 23 which are adjacent to each other, and the fifth electrode is disposed between the electrode pair 200A and the electrode pair 200B. Furthermore, the electrode pair 200A and the electrode pair 200B disposed on respective sides of the third electrode 23 are disposed symmetrically about the third electrode 23. In other words, when viewed in the top view shown in FIG. 2, the electrode pair 200A and the electrode pair 200B are disposed linear-symmetrically about the center axis of the third electrode 23.

The distance between the electrode pair 200A and the electrode pair 200B will now be described. When viewed from the second substrate side, a distance between a center axis of the third electrode 23 and a center axis of the electrode pair 200A disposed on the left side of the third electrode 23 is denoted by P1, and a distance between the center axis of the third electrode 23 and a center axis of the electrode pair 200B disposed on the right side of the third electrode 23 is denoted by P2. Denoting a distance between center axes of the electrode pair 200A and the electrode pair 200B disposed between the adjacent third electrodes 23 by P3, disposition satisfying the following condition is conducted (FIG. 2).

$$P3 > P1 + P2$$

Note that the center axis of the electrode pair 200A disposed on the left side of the third electrode 23 is located in a center between a side face of the electrode pair 200A which is parallel to the second direction 62 and farthest from the third electrode 23 and a side face of the electrode pair 200A which is parallel to the second direction 62 and nearest to the third electrode 23.

Figure 3:
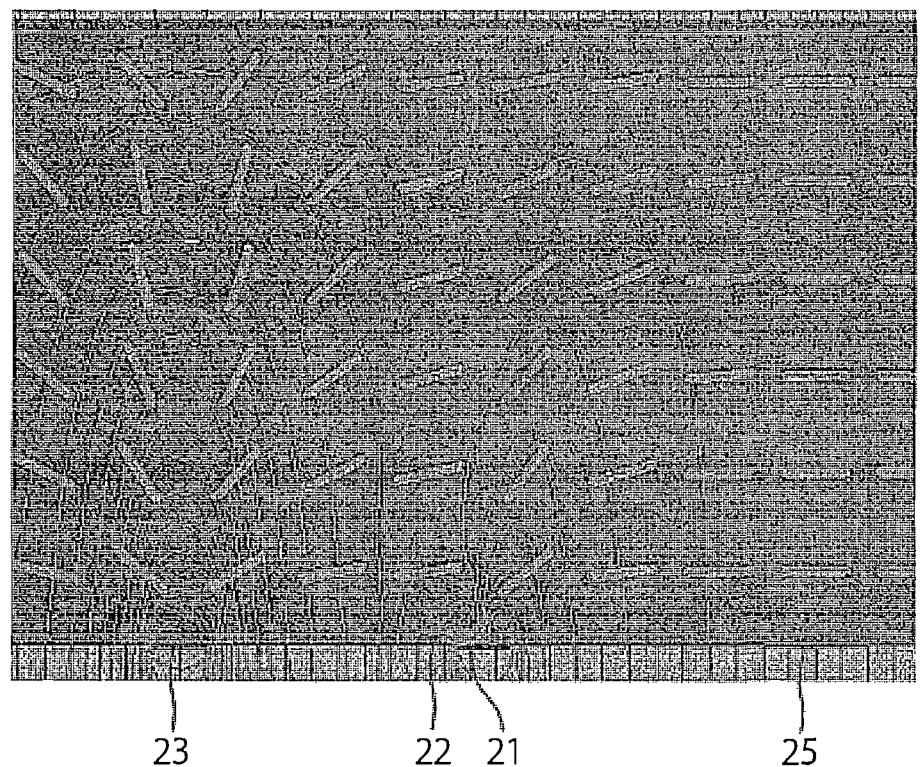
FIG. 3 is a sectional view showing liquid crystal director distribution at the time when a voltage is applied, obtained by cutting along a cut line A-A in FIG. 2.
Figure 4:
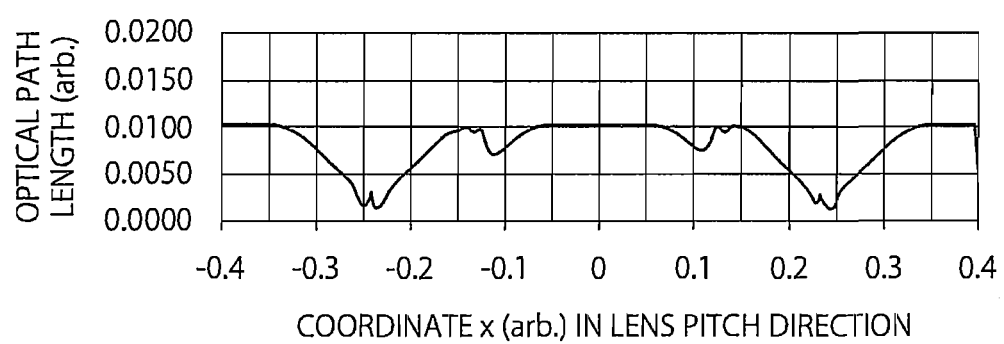
FIG. 4 is a graph showing refractive index distribution calculated from the liquid crystal director distribution shown in FIG. 3.

Operation of the liquid crystal GRIN lens array 1 in the display apparatus according to the first embodiment will now be described. Distribution of liquid crystal directors in a plane when a voltage is applied to each electrode obtained by cutting along a cut line A-A in FIG. 2 is shown in FIG. 3. The distribution of the liquid crystal directors is found by simulation. Refractive index distribution calculated from the liquid crystal director distribution shown in FIG. 3 is shown in FIG. 4. The abscissa axis in FIG. 4 indicates a coordinate in the lens pitch direction. A center axis of the fifth electrode 25 shown in FIG. 2 is taken as an origin, and the direction parallel to the first direction 61 is taken as the x axis. The abscissa axis indicates a distance from the origin. An ordinate axis in FIG. 4 indicates the optical path length.

In the liquid crystal GRIN lens array 1 according to the first embodiment, the fourth electrode 24 is set as a reference voltage (for example, GND) and the same voltage as that of the fourth electrode 24 is applied to the fifth electrode 25. And in both the electrode pair 200A and the electrode pair 200B, a higher voltage is applied to the first electrode 21 as compared with the second electrode 22. Specifically, denoting the voltage applied to the first electrode 21 by V1 and denoting the voltage applied to the second electrode 22 by V2, the relation V1>V2 holds true.

And the voltage V2 applied to the second electrode 22 is set to become higher than the voltage applied to the fifth electrode 25. A voltage difference between the second electrode 22 and the fifth electrode 25 is set to become less than a threshold voltage Vth of the liquid crystal layer 4. In other words, it follows that V2<Vth. Furthermore, a voltage V3 applied to the third electrode 23 is equal to the voltage V1 applied to the first electrode 21.

The orientation state of the liquid crystal molecules 41 when the voltages are thus applied will now be described. First, the voltage difference between the fifth electrode 25 and the fourth electrode 24 is zero. As shown in FIGS. 3 and 4, therefore, the liquid crystal molecules 41 maintain the initial orientation state. In other words, the apparent refractive index becomes larger, and consequently the optical path length also becomes larger.

Between the first electrode 21 and the fourth electrode 24, the predetermined voltage V1 is applied and consequently the liquid crystal molecules 41 rise. As a result, the apparent refractive index becomes smaller and consequently the optical path length also becomes smaller. Note that between the fifth electrode 25 and the first electrode 21, the refractive index changes gradually and the optical path length also changes gradually in accordance therewith.

On the other hand, between the second electrode 22 and the fourth electrode 24, the voltage difference is set equal to V2 which is smaller than the threshold voltage Vth of the liquid crystal layer 4. Therefore, little rise of the liquid crystal molecules 41 is seen. As a result, the apparent refractive index becomes larger and the optical path length also becomes larger. Note that since the first electrode 21 and the second electrode 22 are formed to be stacked one upon the other, the change of the refractive index in this part becomes steep.

And between the third electrode 23 and the fourth electrode 24, the same voltage as the voltage V1 applied to the first electrode 21 is applied as described above. Therefore, the apparent refractive index becomes smaller, and consequently the optical path length also becomes smaller.

Thus, refractive index distribution (optical path length distribution) as a Fresnel lens is implemented.

Figure 5:
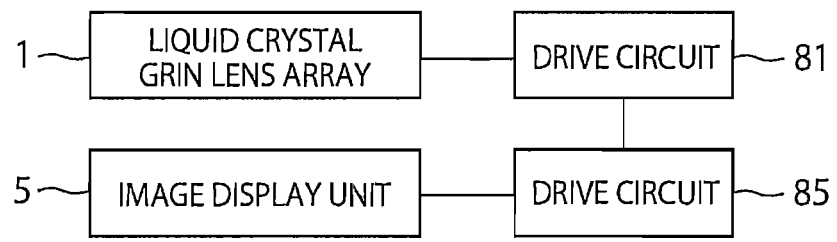
FIG. 5 is a block diagram showing an image display apparatus according to the first embodiment.

As shown in FIG. 5, the liquid crystal GRIN lens array 1 is driven by a drive circuit 81. Voltages satisfying the above-described conditions are applied to the electrodes 21 to 25 of the liquid crystal GRIN lens array 1. Furthermore, the image display unit 5 is driven by a drive circuit 85. When the drive circuit 81 is in synchronism with the drive circuit 85 and the image display unit 5 displays a three-dimensional image at this time, the voltages satisfying the above-described conditions are applied to the electrodes 21 to 25 of the liquid crystal GRIN lens array 1 by the drive circuit 81. At this time, the interval between the third electrodes 23 which are adjacent to each other shown in FIG. 1 becomes one unit of the lens, i.e., the lens pitch, and it corresponds to one of exit pupils at the time when displaying a three-dimensional image. When the image display unit 5 displays a two-dimensional image, the reference voltage (GND) is applied to the electrodes 21 to 25 of the liquid crystal GRIN lens array 1 by the drive circuit 81.

Effects of the first embodiment will now be described.

In the present embodiment, the center axis of the second electrode 22 in the electrode pair 200A is disposed on the third electrode 23 side as compared with the center axis of the first electrode 21, and the center axis of the second electrode 22 in the electrode pair 200B is disposed on the third electrode 23 side as compared with the center axis of the first electrode 21, as described above. As a result, the Fresnel lens array can be implemented with a smaller number of electrodes as compared with the conventional art. Therefore, it becomes possible to process the transparent electrodes finely by using the ordinary semiconductor manufacturing technique without using a dedicated technique for processing the transparent electrodes finely, and the liquid crystal GRIN lens array can be produced at a low cost. Furthermore, since the number of electrodes is small, the number of kinds of voltages required for control can be made small, and cost can be reduced by making the drive simplified.

Furthermore, suitable steep refractive index distribution can be generated as a Fresnel lens and high performance of the lens can be implemented by forming the first electrode 21 and the second electrode 22 corresponding to the first electrode 21 as in the present embodiment. Study conducted by the present inventors has revealed that for generating such steep refractive index distribution it is desirable to shorten a gap between the first electrode 21 and the second electrode 22, i.e., a minimum distance between the first electrode 21 and the second electrode 22. Here, the minimum distance between the first electrode 21 and the second electrode 22 means a minimum value among distances between arbitrary points of the first electrode 21 and arbitrary points of the second electrode 22. In the present embodiment, the first electrode 21 and the second electrode 22 overlap when viewed from the fourth electrode 24. Therefore, the gap between the first electrode 21 and the second electrode 22 becomes a difference between the thickness of the dielectric layer 3 and the thickness of the first electrode 21. As a result, overlapping parts of lines of electric force are confined between the first electrode 21 and the second electrode 22 and steep refractive index distribution is generated by an electric field which leaks from nonoverlapping parts as shown in FIG. 3. However, it is desirable that the interval between the first electrode 21 and the second electrode 22 along the first direction 61, i.e., the maximum distance along the first direction 61 of the nonoverlapping parts when viewed from the fourth electrode 24 becomes at least the thickness of the dielectric layer 3 or less. This is because if the above-described maximum distance becomes greater than the thickness of the dielectric layer 3 the leak electric field between the first electrode 21 and the second electrode 22 becomes great and an electric field component parallel to the first direction 61 is generated and consequently it becomes difficult to generate steep refractive index distribution. Here, the maximum distance between the first electrode 21 and the second electrode 22 means a maximum value among distances between arbitrary points of the first electrode 21 and arbitrary points of the second electrode 22.

Furthermore, as described earlier, it becomes possible to further reduce the thickness of the liquid crystal layer 4 by disposing respective electrodes to satisfy the following relation along the first direction 61.

$$P3 > P1 + P2$$

This is apparent from a fact obtained by referring to the refractive index distribution shown in FIG. 4, i.e., a fact that the thickness of the liquid crystal layer 4 can be reduced by providing a Fresnel step in the vicinity of an end portion of the lens, i.e., in the vicinity of the center axis of the third electrode 23 as compared with the vicinity of the optical axis of the lens, i.e., the center axis of the fifth electrode 25. Note that the thickness of the liquid crystal layer 4 can be made thinnest when a value at the optical axis coincides with a value at the Fresnel step part in the refractive index distribution shown in FIG. 4. It is desirable to dispose the respective electrodes in advance to implement such refractive index distribution and adjust the applied voltages.

Furthermore, as for the voltages applied to the liquid crystal GRIN lens array 1 according to the first embodiment, the voltage difference between the second electrode 22 and the fourth electrode 24 is set equal to a value less than the threshold voltage Vth of the liquid crystal layer 4. As a result, it becomes possible to suppress the rising of the liquid crystal molecules 41 between the second electrode 22 and the fourth electrode 24, and suitable steep refractive index distribution can be implemented as a Fresnel lens. In addition, since the voltage applied to the second electrode 22 can be made larger, it becomes possible to make the voltage difference between the second electrode 22 and the first electrode 21 smaller and the leak electric field between the first electrode 21 and the second electrode 22 can be suppressed. As a result, it is possible to reduce a component of the leak electric field parallel to the first direction 61 and implement steeper refractive index characteristics.

As for positions of end portions (side faces) of the first electrode 21 and the second electrode 22 corresponding to the first electrode on an opposite side from the third electrode 23, i.e., on the fifth electrode 25 side in the first embodiment, the position of the end portion of the second electrode 22 is located on the third electrode 23 side as compared with the position of the end portion of the first electrode 21 as shown in FIG. 1. However, the position of the end portion of the second electrode 22 may project to the fifth electrode 25 side as compared with the position of the end portion of the first electrode 21. Supposing that the thickness of the dielectric layer 3 is t, however, it is desirable that the quantity of projection of the position of the end portion of the second electrode 22 to the fifth electrode 25 side as compared with the position of the end portion of the first electrode 21 is t or less. This is because if the quantity of the projection is greater than t, then the lines of electric force generated by the second electrode 22 are not shielded sufficiently by the first electrode 21 and the refractive index distribution as the lens is disturbed, resulting in lowered performance. In other words, it is possible to implement suitable refractive index distribution as the Fresnel lens and improve the performance, owing to the above-described configuration.

As for positions of end portions of the first electrode 21 and the second electrode 22 corresponding to the first electrode on the third electrode 23 side in the first embodiment, the position of the end portion of the second electrode 22 projects from the position of the end portion of the first electrode 21 as shown in FIG. 1. Supposing that the thickness of the dielectric layer 3 is t, it is desirable that the quantity of projection is at least t. This is because if the quantity of the projection is less than t, then the lines of electric force generated by the second electrode 22 are shielded by the first electrode 21, resulting in lowered performance as the Fresnel lens. In other words, the lens performance can be improved, owing to the above-described configuration, which is desirable.

In addition, when the width of the first electrode 21 viewed from the fourth electrode 24 is compared with the width of the second electrode 22 corresponding to the first electrode 21, it is desirable that the width of a part of the second electrode 22 which does not overlap the first electrode 21 is greater than the width of the first electrode 21. Refractive index distribution peculiar to the Fresnel lens can be implemented suitably by such a configuration. In other words, it is desirable to make the electrode width of the second electrode 22 which should implement gentle refractive index distribution greater than the electrode width of the first electrode 21 which should steeper refractive index distribution.

In the first embodiment, it has been described that the electrode pair 200A and the electrode pair 200B are disposed symmetrically about the third electrode 23. However, this is not restrictive. It is not always necessary that the electrode pair 200A and the electrode pair 200B are disposed symmetrically. However, the refractive index distribution as the lens can be made more desirable when the electrode pair 200A and the electrode pair 200B are disposed symmetrically, which is desirable.

Furthermore, since the second electrode 22 is disposed on the dielectric layer 3 in the first embodiment, the second electrode 22 is disposed on the liquid crystal layer 4 side as compared with the first electrode 21. As a result, it becomes possible to suppress the disturbance of the electric field in a part (the vicinity of the electrode 22) where gentler refractive index distribution should be implemented, and the lens performance can be improved.

Furthermore, since the fifth electrode 25 is provided between the third electrodes 23 which are adjacent to each other in the first embodiment, it becomes possible to make the refractive index distribution as the lens more ideal and the lens performance can be improved.

According to the first embodiment, a gradient index liquid crystal optical apparatus and a display apparatus which are simple in structure, easy to drive and low in cost can be provided as described heretofore.

(First Modification)

Figure 6:
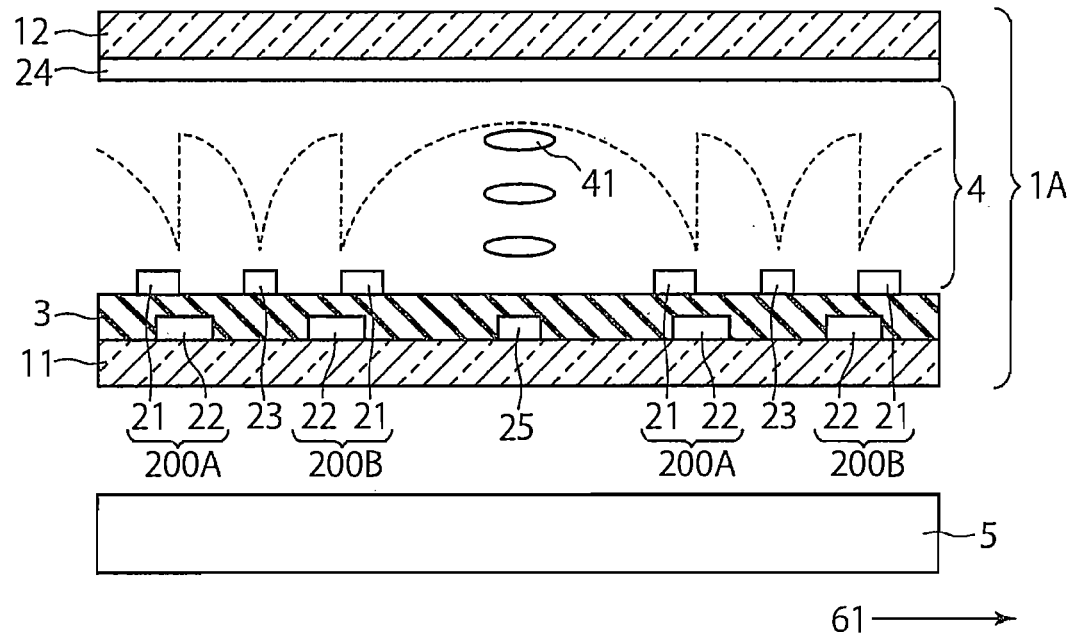
FIG. 6 is a block diagram showing an image display apparatus according to a first modification of the first embodiment.

An image display apparatus according to a first modification of the first embodiment is shown in FIG. 6. FIG. 6 is a sectional view showing the image display apparatus according to the first modification. The image display apparatus according to the first modification has a configuration obtained by replacing the liquid crystal GRIN lens array 1 in the image display apparatus according to the first embodiment shown in FIG. 1 with a liquid crystal GRIN lens array 1A. The liquid crystal GRIN lens array 1A has a configuration obtained from the liquid crystal GRIN lens array 1 shown in FIG. 1 by disposing the first electrode 21 and the third electrode 23 on the dielectric layer 3 and disposing the second electrode 22 on the first substrate 11.

In the first modification having such a configuration as well, a gradient index liquid crystal optical apparatus and a display apparatus which are simple in structure, easy to drive and low in cost can be provided in the same way as the first embodiment. Furthermore, in the first modification, the first electrode 21 and the third electrode 23 are disposed on the liquid crystal layer 4 side of the dielectric layer 3. In the first electrode 21 and the third electrode 23, therefore, voltage drop caused by the dielectric layer 3 can be suppressed. Since a relatively higher voltage as compared with the second electrode 22 and the fifth electrode 25 is applied to the first electrode 21 and the third electrode 23, the effect of the drive voltage reduction is great. In other words, since the maximum output voltage of the drive circuit can be reduced, not only simplification of the drive circuit becomes possible, but also the power dissipation can be reduced and consequently it is desirable.

(Second Modification)

Figure 7:
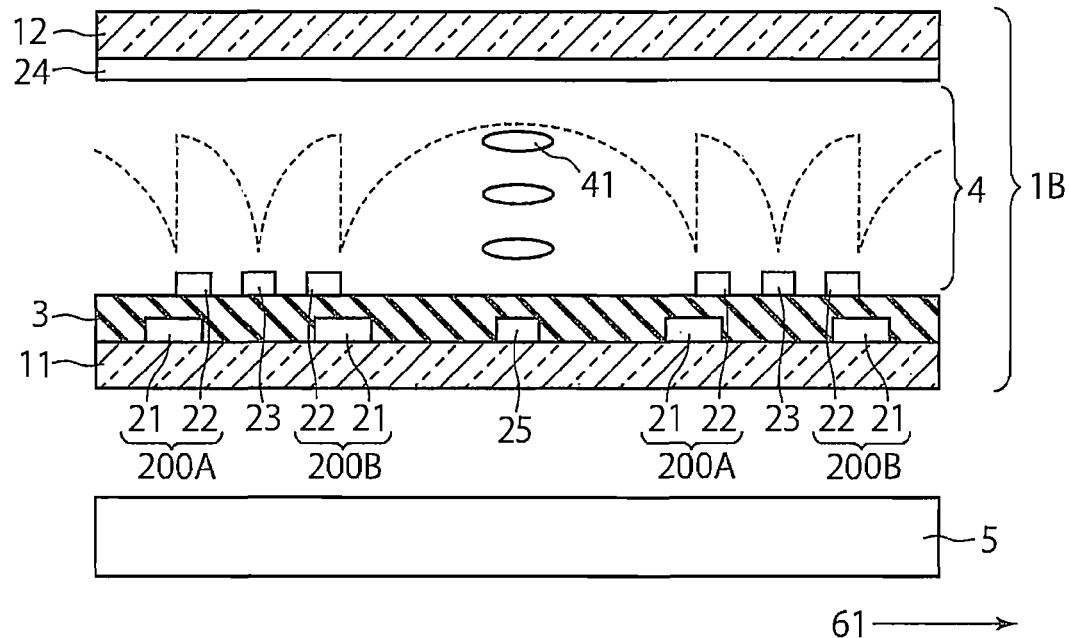
FIG. 7 is a block diagram showing an image display apparatus according to a second modification of the first embodiment.

An image display apparatus according to a second modification of the first embodiment is shown in FIG. 7. FIG. 7 is a sectional view showing the image display apparatus according to the second modification. The image display apparatus according to the second modification has a configuration obtained by replacing the liquid crystal GRIN lens array 1 in the image display apparatus according to the first embodiment shown in FIG. 1 with a liquid crystal GRIN lens array 1B. The liquid crystal GRIN lens array 1B has a configuration obtained from the liquid crystal GRIN lens array 1 shown in FIG. 1 by disposing the third electrode 23 on the dielectric layer 3.

In the second modification having such a configuration as well, a gradient index liquid crystal optical apparatus and a display apparatus which are simple in structure, easy to drive and low in cost can be provided in the same way as the first embodiment.

Furthermore, since the second electrode 22 is disposed on the liquid crystal layer 4 side as compared with the first electrode 21 in the second modification, it becomes possible to suppress the disturbance of the electric field in a part (the vicinity of the electrode 22) where gentler refractive index distribution should be implemented, and the lens performance can be improved, as compared with the first modification.

(Third Modification)

Figure 8:
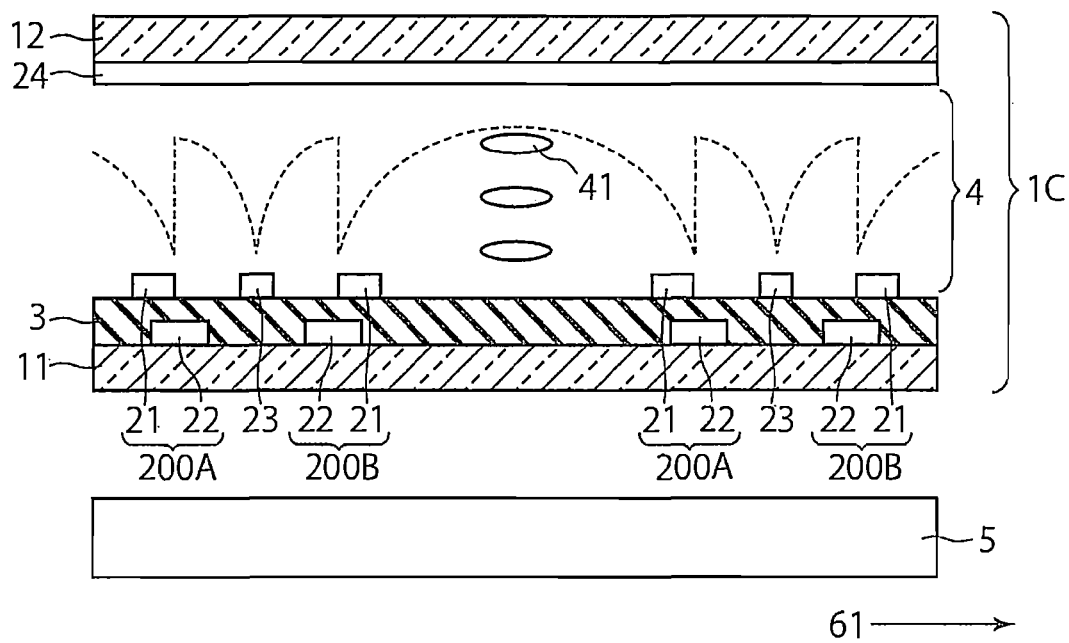
FIG. 8 is a block diagram showing an image display apparatus according to a third modification of the first embodiment.

An image display apparatus according to a third modification of the first embodiment is shown in FIG. 8. FIG. 8 is a sectional view showing the image display apparatus according to the third modification. The image display apparatus according to the third modification has a configuration obtained by replacing the liquid crystal GRIN lens array 1A in the image display apparatus according to the first modification shown in FIG. 6 with a liquid crystal GRIN lens array 1C. The liquid crystal GRIN lens array 1C has a configuration obtained from the liquid crystal GRIN lens array 1A shown in FIG. 6 by removing the fifth electrode 25.

In the third modification having such a configuration as well, a gradient index liquid crystal optical apparatus and a display apparatus which are simple in structure, easy to drive and low in cost can be provided in the same way as the first modification.

(Fourth Modification)

Figure 9:
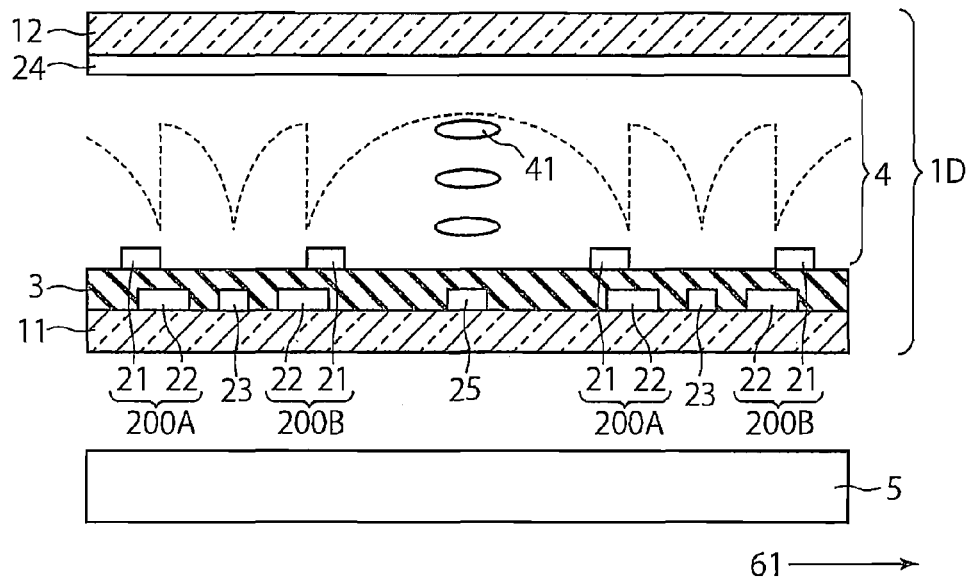
FIG. 9 is a block diagram showing an image display apparatus according to a fourth modification of the first embodiment.

An image display apparatus according to a fourth modification of the first embodiment is shown in FIG. 9. FIG. 9 is a sectional view showing the image display apparatus according to the fourth modification. The image display apparatus according to the fourth modification has a configuration obtained by replacing the liquid crystal GRIN lens array 1 in the image display apparatus according to the first embodiment shown in FIG. 1 with a liquid crystal GRIN lens array 1D. The liquid crystal GRIN lens array 1D has a configuration obtained from the liquid crystal GRIN lens array 1 shown in FIG. 1 by disposing the first electrode 21 on the dielectric layer 3 and disposing the second electrode 22 on the first substrate 11. In other words, the liquid crystal GRIN lens array 1D has a configuration in which the second electrode 22, the third electrode 23 and the fifth electrode 25 are disposed on the first substrate 11.

In general, a position alignment error might occur when the electrodes formed on the first substrate 11 and the electrodes formed on the dielectric layer 3 are formed. In the present modification, it is effective in reducing the influence caused by the position alignment error to form the third electrode 23, the fifth electrode 25 and the second electrode 22 on the same layer, i.e., on the first substrate 11. As a result, the position relation between the lens end and the lens center can be generated by using the same exposure process. Therefore, it becomes possible to suppress the deviation of a principal part such as the lens center, and the lens performance can be improved. Note that it is more desirable to form both electrodes at the lens end and the lens center on the first substrate 11 than to form the both electrodes on the dielectric layer 3. This is because the influence of the dielectric layer 3 can be excluded. In the fourth modification, the third electrode 23, the fifth electrode 25 and the second electrode 22 are formed on the first substrate 11, and the first electrode is formed on the dielectric layer 3. Alternatively, opposite formation can be performed. In other words, it is possible to form the third electrode 23, the fifth electrode 25 and the second electrode 22 on the dielectric layer 3 and form the first electrode on the first substrate 11.

In the fourth modification having such a configuration as well, a gradient index liquid crystal optical apparatus and a display apparatus which are simple in structure, easy to drive and low in cost can be provided in the same way as the first modification.

In the first embodiment and the first to fourth modifications, it has been described that the initial orientation of the liquid crystal is horizontal orientation in the horizontal direction. However, the initial orientation is not restricted to this. Other liquid crystal orientation modes can also be applied.

Furthermore, in the first embodiment and the first to fourth modifications, it has been described that the gradient index liquid crystal optical apparatus is a liquid crystal lens array element. However, this is not restrictive. It suffices that the optical apparatus has performance for implementing the display of a three-dimensional image. For example, refractive index distribution as a perfect lens may not be implemented, and the gradient index liquid crystal optical apparatus which functions as a prism array element may be used.

In addition, in the first embodiment and the first to fourth modifications, the gradient index liquid crystal optical apparatus is used as the gradient index optical apparatus for controlling light rays illuminated from the image display unit 5. However, the used material is not restricted to liquid crystal. A material can be applied as the gradient index optical apparatus as long as the material has a similar electrooptic effect.

Furthermore, in the first embodiment and the first to fourth modifications, it has been described that the lens array is arranged along the first direction 61. However, this is not restrictive. For example, it is also possible to implement a fly eye lens by arranging the lens array in a two-dimensional form.

Second Embodiment

Figure 10:
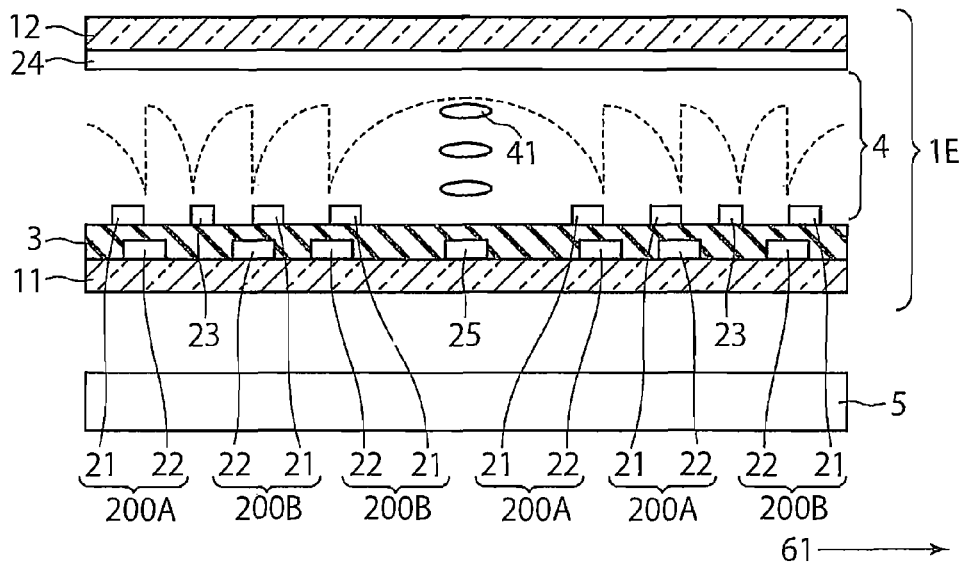
FIG. 10 is a block diagram showing an image display apparatus according to a second embodiment.

An image display apparatus according to a second embodiment will now be described with reference to FIG. 10. FIG. 10 is a sectional view showing an image display apparatus according to the second embodiment.

The image display apparatus according to the second embodiment has a configuration obtained from the configuration of the image display apparatus according to the first modification of the first embodiment shown in FIG. 6 by replacing the liquid crystal GRIN lens array 1A with a liquid crystal GRIN lens array 1E. The liquid crystal GRIN lens array 1E has a configuration obtained from the configuration of the liquid crystal GRIN lens array 1A shown in FIG. 6 by further providing at least one electrode pair 200B including the first electrode 21 and the second electrode 22 between the fifth electrode 25 and the third electrode 23 disposed on the left side thereof and further providing at least one electrode pair 200A including the first electrode 21 and the second electrode 22 between the fifth electrode 25 and the third electrode 23 disposed on the right side thereof. Note that, in FIG. 10, one electrode pair 200A and one electrode pair 200B are further provided. In other words, in the first embodiment and the first to fourth modifications, the liquid crystal GRIN lens array is a two-stage Fresnel lens. On the other hand, the second embodiment differs in that a multi-stage Fresnel lens is implemented.

Operation in the second embodiment is similar to that described in the first embodiment.

In the second embodiment, it is possible to further reduce the thickness of the liquid crystal layer 4 and reduce the cost by using the multi-stage Fresnel lens.

In the second embodiment as well, a gradient index liquid crystal optical apparatus and a display apparatus which are simple in structure, easy to drive and low in cost can be provided in the same way as the first embodiment.

Note that the multi-stage Fresnel lens as in the second embodiment can be applied to the first embodiment or its modifications.

Third Embodiment

Figure 11:
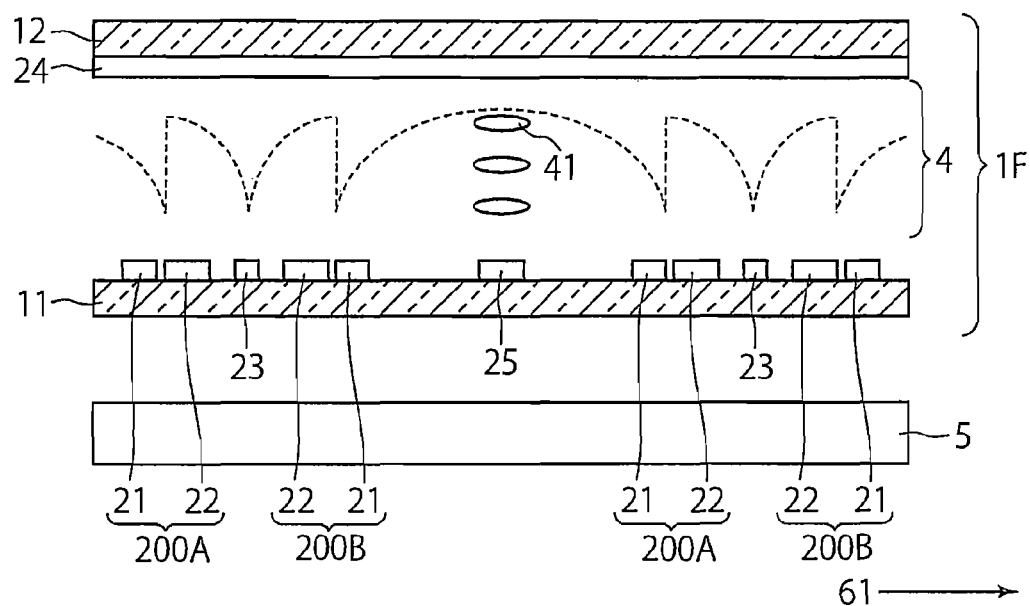
FIG. 11 is a block diagram showing an image display apparatus according to a third embodiment.

An image display apparatus according to a third embodiment will now be described with reference to FIG. 11. FIG. 11 is a sectional view showing the image display apparatus according to the third embodiment.

In the first and second embodiments, the liquid crystal GRIN lens array includes the dielectric layer 3, and the first electrode 21 and the second electrode 22 are formed in different layers with the dielectric layer 3 sandwiched between. On the other hand, the third embodiment differs in that the dielectric layer 3 is not provided and the first electrode 21 and the second electrode 22 are formed on the first substrate 11. Operation in the third embodiment is similar to that in the first embodiment.

In the third embodiment, the liquid crystal GRIN lens can be implemented as a Fresnel lens by using electrodes formed in the same layer (single layer). Since the number of processes in the single layer electrodes can be reduced as compared with fabrication of the electrodes having a stack structure as in the first and second embodiments, it is possible to lower the cost.

In the third embodiment as well, a gradient index liquid crystal optical apparatus and a display apparatus which are simple in structure, easy to drive and low in cost can be provided in the same way as the first embodiment.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:

1. A gradient index liquid crystal optical apparatus comprising:
    a first substrate including a principal plane;
    a second substrate;
    a liquid crystal layer disposed between the principal plane of the first substrate and the second substrate;
    a first electrode, a second electrode, a third electrode, and a fourth electrode arranged in a first direction that is parallel to the principal plane between the principal plane and the liquid crystal layer;
    a fifth electrode, a sixth electrode, a seventh electrode, and an eighth electrode arranged in the first direction between the principal plane and the liquid crystal layer, the fifth electrode at least partially overlapping the first electrode when projected on the principal plane, the sixth electrode at least partially overlapping the second electrode when projected on the principal plane, the seventh electrode at least partially overlapping the third electrode when projected on the principal plane, and the eighth electrode at least partially overlapping the fourth electrode when projected on the principal plane;
    a ninth electrode and a tenth electrode disposed between the principal plane and the liquid crystal layer, the ninth electrode being located between the fifth electrode and the sixth electrode when projected on the principal plane, and the tenth electrode being located between the seventh electrode and the eighth electrode when projected on the principal plane;
    dielectric layers disposed between the first electrode and the fifth electrode, between the second electrode and the sixth electrode, between the third electrode and the seventh electrode, and between the fourth electrode and the eighth electrode; and
    an eleventh electrode disposed between the second substrate and the liquid crystal layer,
    a minimum distance between the fifth electrode and the ninth electrode projected on the principal plane being less than a minimum distance between the first electrode and the ninth electrode projected on the principal plane, a minimum distance between the sixth electrode and the ninth electrode projected on the principal plane being less than a minimum distance between the second electrode and the ninth electrode projected on the principal plane, a minimum distance between the seventh electrode and the tenth electrode projected on the principal plane being less than a minimum distance between the third electrode and the tenth electrode projected on the principal plane, a minimum distance between the eighth electrode and the tenth electrode projected on the principal plane being less than a minimum distance between the fourth electrode and the tenth electrode projected on the principal plane,
    a minimum distance between the sixth electrode and the third electrode projected on the principal plane being greater than a minimum distance between the second electrode and the third electrode projected on the principal plane, and a minimum distance between the seventh electrode and the second electrode projected on the principal plane being greater than the minimum distance between the third electrode and the second electrode projected on the principal plane.

2. The gradient index liquid crystal optical apparatus according to claim 1, wherein:
    a difference between the minimum distance between the sixth electrode and the third electrode projected on the principal plane and the minimum distance between the second electrode and the third electrode projected on the principal plane is equal to or less than a thickness of the dielectric layer disposed between the second electrode and the sixth electrode; and
    a difference between the minimum distance between the seventh electrode and the second electrode projected on the principal plane and the minimum distance between the third electrode and the second electrode projected on the principal plane is equal to or less than a thickness of the dielectric layer disposed between the third electrode and the seventh electrode.

3. The gradient index liquid crystal optical apparatus according to claim 1, wherein:
- a difference between the minimum distance between the sixth electrode and the ninth electrode projected on the principal plane and the minimum distance between the second electrode and the ninth electrode projected on the principal plane is equal to or more than a thickness of the dielectric layer disposed between the second electrode and the sixth electrode; and
- a difference between the minimum distance between the seventh electrode and the tenth electrode projected on the principal plane and the minimum distance between the third electrode and the tenth electrode projected on the principal plane is equal to or more than a thickness of the dielectric layer disposed between the third electrode and the seventh electrode.

4. The gradient index liquid crystal optical apparatus according to claim 1, wherein:
- a difference between the minimum distance between the fifth electrode and the ninth electrode projected on the principal plane and the minimum distance between the first electrode and the ninth electrode projected on the principal plane is equal to or greater than a thickness of the dielectric layer disposed between the first electrode and the fifth electrode; and
- a difference between the minimum distance between the eighth electrode and the tenth electrode projected on the principal plane and the minimum distance between the fourth electrode and the tenth electrode projected on the principal plane is equal to or more than a thickness of the dielectric layer disposed between the fourth electrode and the eighth electrode.

5. The gradient index liquid crystal optical apparatus according to claim 1, wherein:
- a length in the first direction of a portion of the fifth electrode projected on the principal plane, which does not overlap the first electrode, is longer than a length in the first direction of the first electrode;
- a length in the first direction of a portion of the sixth electrode projected on the principal plane, which does not overlap the second electrode, is longer than a length in the first direction of the second electrode;
- a length in the first direction of a portion of the seventh electrode projected on the principal plane, which does not overlap the third electrode, is longer than a length in the first direction of the third electrode; and
- a length in the first direction of a portion of the eighth electrode projected on the principal plane, which does not overlap the fourth electrode, is longer than a length in the first direction of the fourth electrode.

6. The gradient index liquid crystal optical apparatus according to claim 1, further comprising a twelfth electrode disposed between the principal plane and the liquid crystal layer, and, when projected on the principal plane, disposed between the second electrode and the third electrode.

7. The gradient index liquid crystal optical apparatus according to claim 1, further comprising a driving unit configured to apply:
- a first voltage between the first electrode and the eleventh electrode, between the second electrode and the eleventh electrode, between the third electrode and the eleventh electrode, and between the fourth electrode and the eleventh electrode;
- a second voltage that is lower than the first voltage between the fifth electrode and the eleventh electrode, between the sixth electrode and the eleventh electrode, between the seventh electrode and the eleventh electrode, and between the eighth electrode and the eleventh electrode; and
- a third voltage that is higher than the second voltage between the ninth electrode and the eleventh electrode, and between the tenth electrode and the eleventh electrode.

* * * * *